June 13, 1967  C. L. HUFFMAN  3,324,844
HEAT DISTRIBUTION SYSTEM FOR GAS-FIRED OVENS
Filed Nov. 9, 1965  4 Sheets-Sheet 1

INVENTOR
CARL L. HUFFMAN
BY Mason, Fenwick & Lawrence
ATTORNEYS

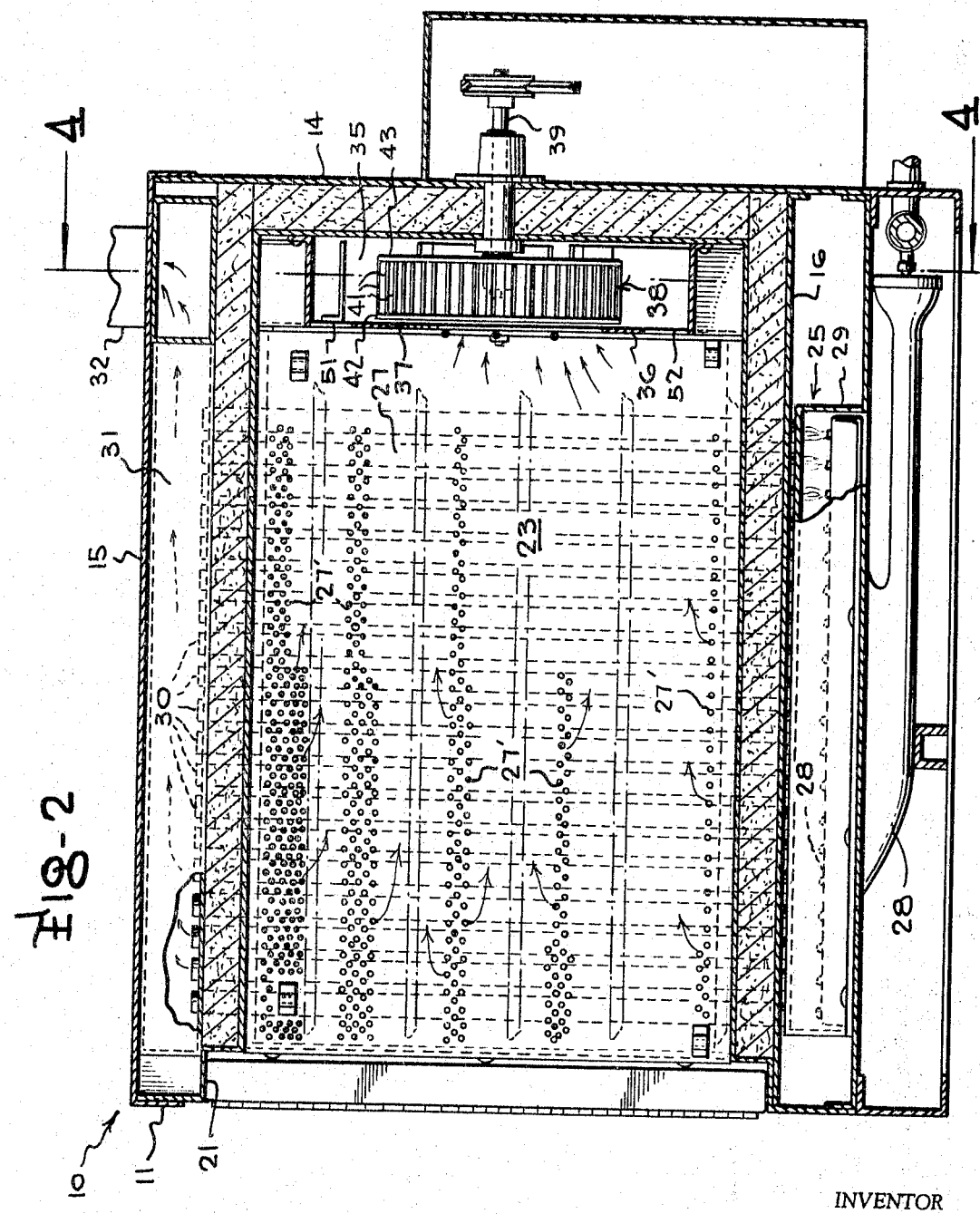

June 13, 1967  C. L. HUFFMAN  3,324,844
HEAT DISTRIBUTION SYSTEM FOR GAS-FIRED OVENS
Filed Nov. 9, 1965  4 Sheets-Sheet 4

INVENTOR
CARL L. HUFFMAN
BY Mason, Fenwick & Lawrence
ATTORNEYS

United States Patent Office

3,324,844
Patented June 13, 1967

1

3,324,844
HEAT DISTRIBUTION SYSTEM FOR
GAS-FIRED OVENS
Carl L. Huffman, Baltimore, Md., assignor to Vulcan-Hart Corporation, Baltimore, Md., a corporation of Indiana
Filed Nov. 9, 1965, Ser. No. 506,935
10 Claims. (Cl. 126—21)

The present invention relates in general to ovens and similar heating apparatus, and more particularly to gas-fired ovens or heating chambers for rapidly heating the contents of the oven, involving gas-fired side heat exchangers arranged to more uniformly distribute heat to the oven contents.

The apparatus of the present invention is adapted to effect rapid production and transfer of heat throughout the volume of the oven in a relatively uniformly distributed manner to all zones or vertical levels of the oven, to render the oven structure particularly well suited to reconstituting frozen foods, to baking of dough products in tiers or sets of vertically spaced pans, to roasting of meats under conditions reducing shrinkage of the meat, and similar applications. For example, the present oven construction permits baking of dough products or heating of other commodities such as frozen foods, when arranged on a vertically spaced and aligned stack of pans, in such a manner that a uniform finished product is obtained with uniform heating results although the number and arrangement of the pans may vary. Conventional ovens designed for such applications have customarily been of either the muffle type or straight convection type. In either case, the heated air is circulated by means of a fan placed in the rear wall of the oven. The heated air is drawn into the center of the fan and rejected behind a baffle at the rear of the oven. With such a construction, variation in heating between different zones of the oven is prevalent as the heat distribution is not uniform resulting in non-uniformity of heating or baking of the finished product in different zones of the oven, and in the case of the multiple pan vertical group of pans in dough product baking ovens, variation in the number of pans disrupts the convection patterns in different ways resulting in wide variation in baking results.

An object of the present invention is the provision of a novel heating oven having gas-fired heat producing means and air distributing means arranged to improve production and transfer of heat in a more uniform manner to all zones of the oven.

Another object of the present invention is the provision of a novel gas-fired oven structure having gas-burner heated heat exchangers distributed along the opposite side walls of the oven and means for circulating air about these heat exchangers and through perforations in the oven side walls to uniformly transfer heat to the various zones of the oven.

Another object of the present invention is the provision of a novel oven structure of the type described in the preceding paragraph, wherein the heat exchangers are each in the form of an elongated collecting enclosure or hood member overlying a gas-fired burner and vertical thermally conductive tubes rising from the collecting enclosure to conduct the combustion products in physically isolated thermal exchange relation to convection air to heat the air, the tubes being arranged in a pattern to effect uniform distribution of heat throughout the oven.

Other objects, advantages, and capabilities of the present invention will become apparent from the following detail description, taken in conjunction with the accompanying drawings illustrating several embodiments of the invention.

In the drawings:

FIGURE 2 is a vertical fore-and-aft section view of the oven unit, taken along the line 2—2 of FIGURE 1;

Figure 1:
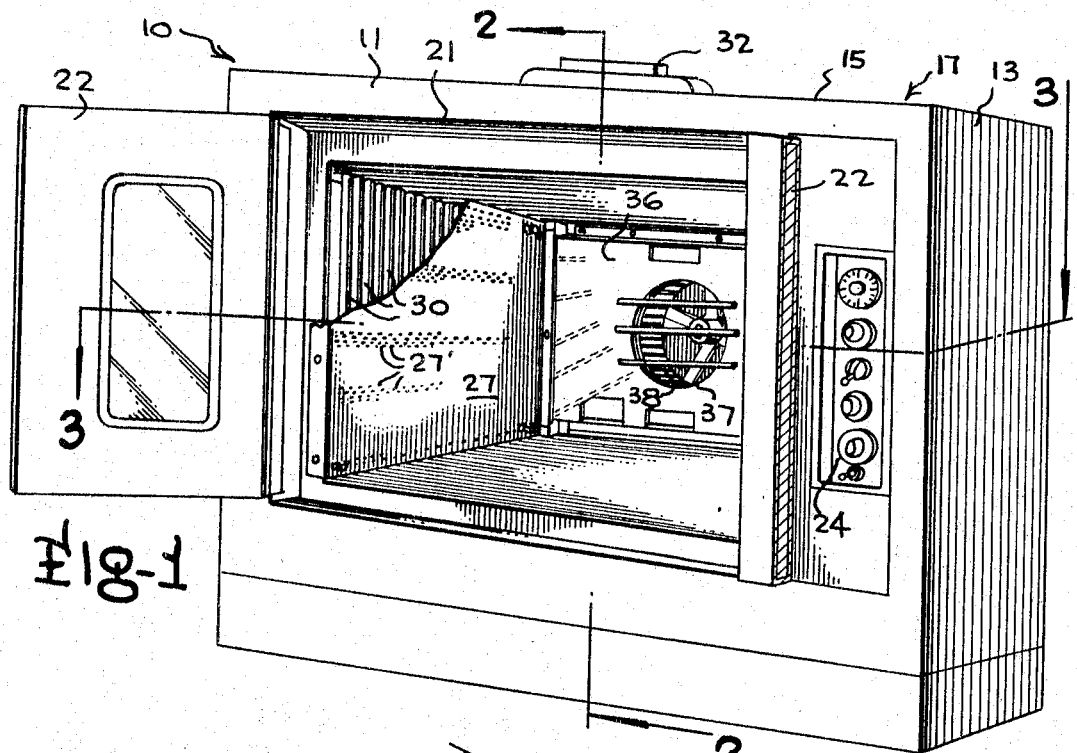
FIGURE 1 is a perspective view of an oven unit embodying the present invention.
Figure 5:
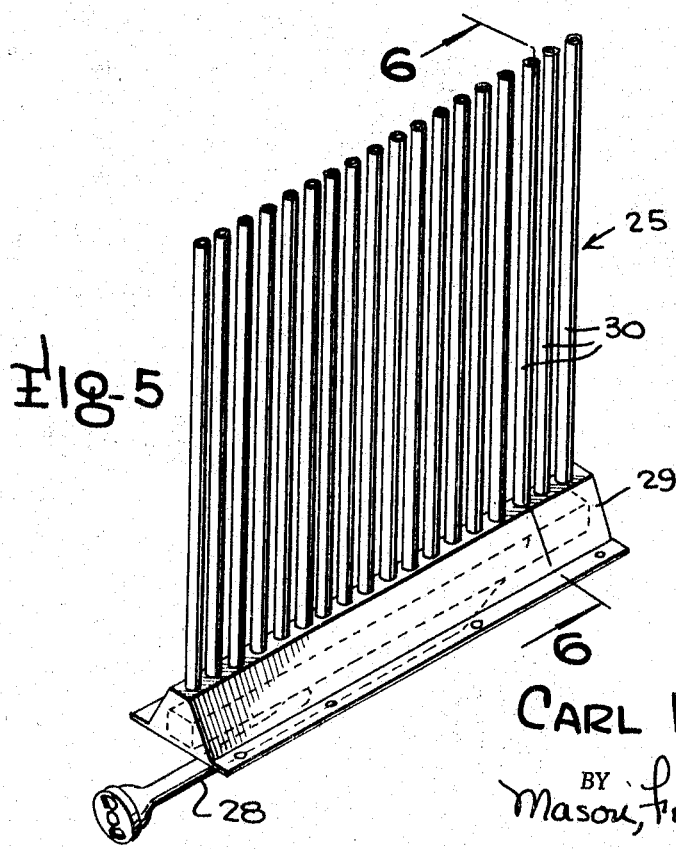
FIGURE 5 is a perspective view of one of the heating units provided at the sides of the oven compartment.
Figure 6:
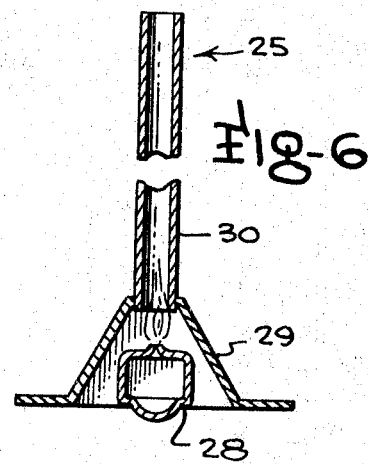
FIGURE 6 is a vertical fore-and-aft section view through the heating unit, taken along the line 6—6 of FIGURE 5.
Figure 3:
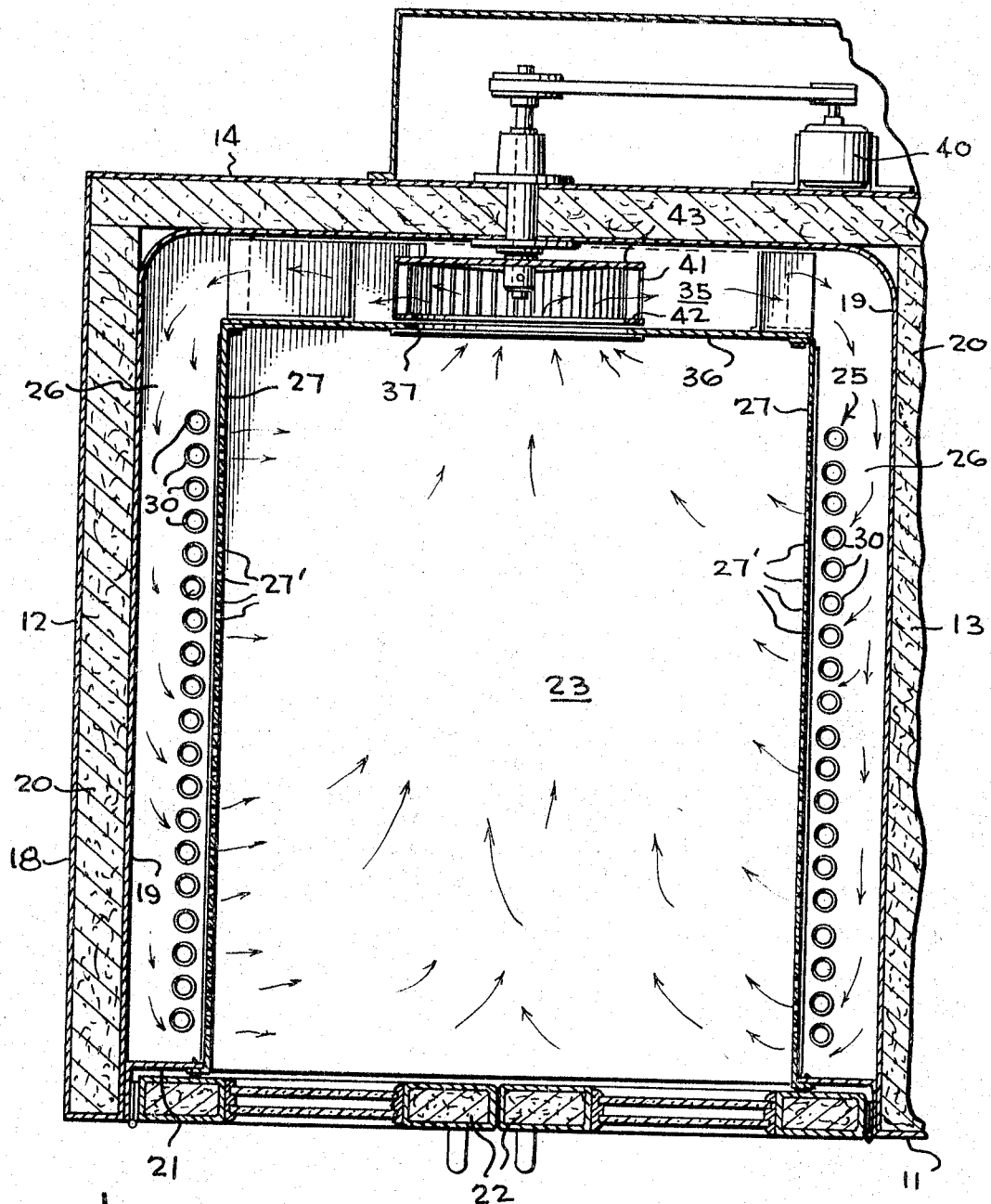
FIGURE 3 is a horizontal section view taken along the line 3—3 of FIGURE 1.
Figure 4:
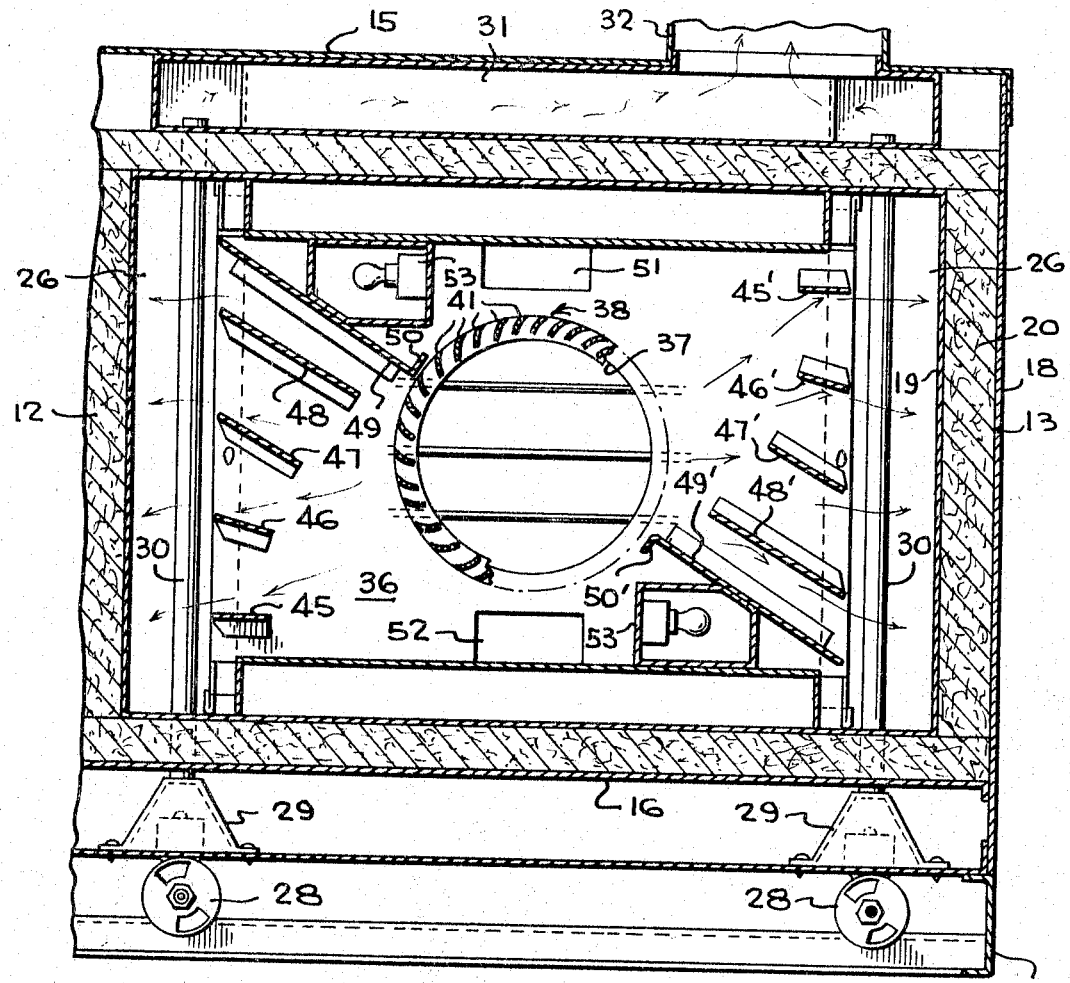
FIGURE 4 is a transverse vertical section view taken along the line 4—4 of FIGURE 2, showing the arrangement of vanes in the rear blower chamber.

Referring to the drawings, wherein like reference characters designate corresponding parts, throughout the several figures, there is shown an oven unit 10 which may be of any desired configuration, here shown as a commercial oven unit, having front wall 11, side walls 12, 13, a rear wall 14, top wall 15 and bottom structure including a bottom wall 16, defining a generally rectangular cabinet supported on a frame 17, from which usual vertical legs (not shown) may depend. These walls are insulated in the usual manner, as by forming each wall of parallel outer and inner sheet metal panels 18, 19 spaced a suitable distance apart to accommodate insulative packing material 20 therebetween. The front wall 11 is provided with the usual rectangular access opening 21 fitted with a hinged door or pair of doors 22, which may be hinged along a side or both sides of the opening 21, or along the top or bottom boundaries of the opening, as desired, through which access is gained to the rectangular oven or heating chamber 23 surrounded by the walls. Conventional manual controls and indicators, such as the timer, thermostat, power switch, and indicator lights, indicated generally by the reference character 24, may also be provided, for example, on the front wall to one side of the access opening 21 as illustrated.

The heating units 25 for the oven 23 are located adjacent each of the side walls 12, 13 in heat exchanger chambers 26 formed as large ducts or spaces substantially coextensive with the area of each side of the oven 23 by oven side liners 27 spaced inwardly from the inner panels 19 of the side walls 12, 13. Each of the heating units 25 comprise an axially elongated burner tube 28 extending from front to rear at the bottom of the chambers 26, of conventional construction, having a series of axially spaced flame ports along the length thereof to produce heat substantially uniformly along the burner and the customary air intake chamber and gas inlet connection at one end of the burner tube. Of course, other conventional types of elongated gas-fired burners than the type illustrated may be used so long as heat is generated substantially uniformly along the length of the side walls. Overlying the burner tube 28 along its entire length is a collector enclosure or hood member 29 formed of a downwardly opening elongated channel member defining an elongated collection zone for collection of the products of combustion, from which a plurality of parallel, vertical heat tubes 30 extend through the height of the side walls and communicate with flues 31 in the top wall 15 of the cabinet to conduct the products of combustion from the hood member 29 to a suitable vent 32 or other outlet flue. The hood member 29 may be conveniently formed with flanges at the free lower edge of the channel sides for securing the same to the bottom of the oven cabinet and has openings spaced along the length of the top or web of the channel to which the heat tubes 30 are fitted. The heat tubes 30 and associated openings are so located along the length of the hood member 29 and burner tube 28 as to form heat exchange tubes for transfer of heat to the air in the heat exchanger chambers 26 in a manner to effect substantially uniform supply of heated air into the oven over the entire area of the side liners 27, which are provided with a pattern of perforations 27' for admission of the heated air from the chamber 26 into the oven 23.

A rear blower or fan chamber 35 is formed across the rear wall 14 by a blower housing panel 36 spaced forwardly from and paralleling the inner panel 19 of the rear wall 14. The blower housing panel 36 has a large circular opening 37 substantially at its center aligned concentrically with a rotary blower impeller 38 having a shaft 39 journalled in the rear wall 14 and terminating outwardly of the rear wall in drive means such as a pulley coupled by a belt with a drive pulley on the shaft of an electric motor 40 mounted on the rear wall 14. The blower impeller 38 herein shown is of the type having a circumferentially arranged series of impeller vanes 41 disposed in an annular zone about the extended axis of the shaft 39 shaped and inclined to draw in air at the center of the impeller through the opening 37 and discharge the air radially outwardly from the periphery of the impeller. The vanes 41 are supported in fixed relation to each other, for example by securing their forward edges to a rigid annular ring 42 and their rear edges to a circular disk 43, or spider type support, fixed to the impeller shaft 39, the radially inward, boundary of the ring 42 and series of vanes 41 being substantially aligned with the edge of the opening 37.

To effect substantially even distribution of flow of air from the blower chamber 35 to the side wall heat exchanger chambers 26 at all vertical levels of the heat exchanger chambers a plurality of air distributor vanes are provided in the blower chamber 35 along each side thereof adjacent the juncture with the side wall chambers 26. In the special example herein illustrated these air distributor vanes comprise vanes 45, 46, 47 and 48 along one lateral end of the blower chamber and vanes 45', 46', 47', and 48' arranged along the opposite lateral end of the chamber 35, inclined substantially in the manner illustrated relative to the air being discharged from the periphery of the blower impeller 38 to define air flow channels between the respective vanes for directing the air flow so that a substantially uniform vertical distribution of air flow enters the rear end of the heat exchanger chambers 26. Also, longer air directing and stripping vanes 49, 49' extend within the blower chamber substantially along a diagonal of the blower housing panel 36 or rear wall and terminate in curved lips 50, 50' at their free edges near the periphery of the impeller 38. Practically all of the air from the blower vanes 41 is stripped at the curved lips 50, 50' and diverted outwardly toward the lateral ends of the blower chamber. This removal of air creates a low pressure area in the zones vertically aligned above and below the center of the impeller 38 adjacent the top and bottom of the oven to draw in air from the top and bottom of the oven through rectangular openings 51, 52 a the top and bottom of blower housing panel 36. These supplementary inlet openings 51, 52 reduce the volume and concentration of recirculated heated air through the center opening 37, permitting air distributed to the top and bottom regions of the oven to be direcly drawn into the blower chamber 35 without first being drawn to the center of the oven. Closed light boxes 53 may be provided behind the air strippers 49, 49' to reduce the effective volume of the blower chamber region behind the air strippers.

With this arrangement, it will be appreciated that air in the oven 23 will be drawn into the central region of the rear blower chamber 35 through the central opening 37 in panel 36 due to suction conditions created at the center of the impeller 38, and air will also be withdrawn into the blower chamber 35 through opening 51 at the top of the oven and opening 52 at the bottom thereof by suction conditions in the zone of blower chamber 35 aligned with openings 51 and 52 produced by coaction of the impeller vanes with the curved lips of the air strippers 49, 49'. The air discharged generally radially from the periphery of the rotating impeller vanes 41, together with some of the air withdrawn through the top and bottom openings 51, 52 and entrained with the impeller discharged air, is directed laterally toward both ends of the blower chamber 35 and distributed by the inclined air directing vanes 45–48, 45'–48' in a substantially uniform vertical distribution into the side wall heat exchanger chambers 26. The air thus directed into the side wall chambers 26 flows about the vertical heat tubes 30, through which the heat and products of combustion rising from the flames at the burner flame ports of burner tubes 28 are conveyed to the flues 31, heating the air surrounding the heat tubes 30 by thermal exchange.

The heated air is then conveyed by the pressure conditions created by the impeller through the perforations 27' in the side liners 27 and into the oven 23 in a substantially uniformly distributed manner from many parts of the side areas defined by the liners 27. As shown in FIGURE 2, the perforation 27' may be in the form of small circular holes arranged in vertically spaced horizontally extending groups or subpatterns aligned horizontally with the zones immediately above the pans (indicated in broken lines in FIGURE 2) on which the products to be heated are supported. The number of holes and the horizontal distance spanned by each group or subpattern of holes may be varied in accordance with well known criteria to provide greater or less admission of heated air from the heat exchanger chambers to the oven at different levels, to achieve uniform heating of the product at the different vertical levels. For example, in one satisfactory embodiment, each oven liner may be provided with five groups of holes of about 5/16 inch diameter, the groups, progressing from top to bottom, having respectively 207 holes, 146 holes, 90 holes, 41 holes, and 37 holes arranged in the manner illustrated in FIGURE 2, with each group having a greater concentration of holes in the region of each group near the front of the oven.

In this manner, the air is heated by the vertically elongated heat tubes 30 in a substantially uniform manner at all vertical levels of the heat exchanger chambers 26, the heat tubes acting in a manner similar to a parallel series of vertically elongated electrical heating elements generating heat along the entire length of the side walls and being distributed along the fore-and-aft axis of the oven to effect substantially uniform heating of air over the whole side wall area. With this arrangement, variation in the loading condition of the oven, for example, by variation in the arrangement or number of baking pans supported on conventional racks (not shown) in the oven will not result in a variation in the heating of the finished product as the heated air is admitted into the heating chamber under similarly heated conditions from many regions within the area defined by the perforated side liners 27 distributed by the arrangement of the perforations 27' to provide uniform supply of heated air through the side liners at plural vertical levels spanning the height of the oven. This arrangement also effects more rapid reconstituting of frozen foods, reduces the baking time of dough products, and reduces the roasting time and shinkage of meats due to the improved heating efficiency of the oven.

Figure 7:
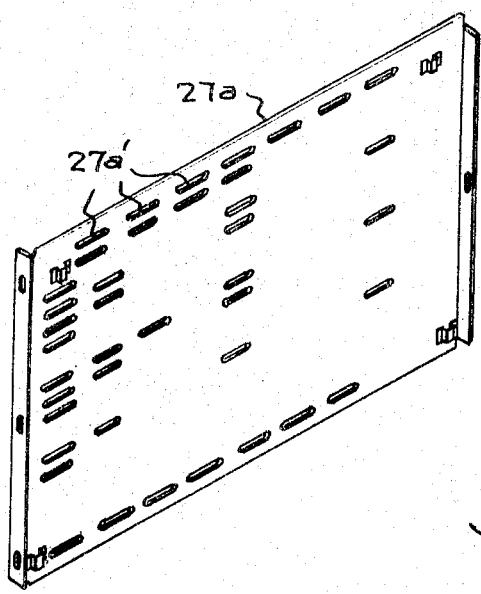
FIGURE 7 is a perspective view of oven liner having slots instead of circular perforations.

It will be appreciated that the spacing and location of the heat tubes 30 of the sidewall heating units 25, of the perforations 27' and of the vanes 45–48, 45'–48' will be arranged to achieve a uniformity of heat distribution in the oven so as to effect uniformity of the finished product to be heated whether the oven is completely loaded or partially loaded. For example, the heat tubes 30 may be spaced uniform distances apart, as illustrated, or spaced more closely together in selected areas, and the location and pattern of the perforations 27' in side liners 27 may be similarly varied, to secure the desired uniform heating. The important feature is that the tubes 30 form a series of heat transfer or exchange sources which extend the height of the sidewalls and are located at relatively closely spaced increments along the whole fore-and-aft length of the sidewall liners 27 to provide heated air in a substantially uniformly distributed manner from plural zones or parts of the area defined by the sidewall liners located to achieve the desired uniform heat distribution. Of course, patterns of slots or perforations of other desired shapes may be provided in the sidewall liners 27 instead of the circular perforations 27' illustrated in the drawings. For example, patterns of slots 27a' arranged in vertically spaced groups may be provided in a distribution to achieve uniform heating at the various vertical levels of the oven, arranged in a pattern such as that shown in the oven side liner 27a of FIGURE 7.

It will be apparent that variout modifications may be made in the invention herein particularly shown and described within the spirit and scope of the invention, and it is desired, therefore, that only such limitations be placed on the invention as are imposed by the prior art and set forth in the appended claims.

What is claimed:

1. A gas-fired, forced air convection oven comprising a substantially rectangular oven compartment bounded by a pair of side walls, top and bottom walls, and a rear wall, said side walls including means defining heat exchanger chambers therein extending substantially coextensively with the area of each side of the oven compartment bounded by side partitions defining the oven compartment sides, elongated gas-fired burner means in the lower regions of said chambers extending substantially the length thereof, heat exchanger means in each of said chambers including a laterally aligned series of elongated vertical heat tubes extending substantially throughout the height of said oven compartment and disposed at spaced locations along the length of said burner means for conveying heat and combustion products from said burner means in heat exchange relation with air in said chambers, means defining an air blower chamber in said rear wall communicating with said oven and laterally with the rearmost ends of said heat exchanger chambers having driven air blower means for withdrawing air from said oven and discharging the air into said heat exchanger chambers in substantially uniform vertically distributed relation, and said side partitions each having perforations distributed over the area of each oven compartment side at plural vertical levels substantially spanning the height of the oven compartment to admit heated air thereto from said heat exchanger compartments.

2. An oven as defined in claim 1, wherein stationary air deflector vanes are provided in said blower chamber adjacent the zones of communication thereof with said heat exchanger chambers for directing air flow from said blower means into said heat exchanger chambers in vertically spaced flow channels effecting substantially uniform vertical distribution of the air discharged into said heat exchanger chambers over the whole height of said heat tubes.

3. An oven as defined in claim 2, wherein said air blower means includes a rotary impeller having circumferentially spaced impeller vanes arranged in an annular path about an axis of rotation substantially adjacent the center of said rear wall for drawing air into the central zone of said impeller and discharging the air outwardly from the periphery of the impeller, said rear wall including a partition dividing said blower chamber from the oven compartment having a circular air intake opening therein concentric with said axis of rotation and conforming substantially with the diameter of the inner boundary of said annular path.

4. An oven as defined in claim 3 wherein said last-mentioned partition has a pair of air intake openings respectively located adjacent the top and bottom of said partition substantially aligned with said axis and spaced from said circular openings, and vane means in said blower chamber coacting with said impeller to produce suction conditions in said blower chamber immediately adjacent said pair of openings for withdrawing air from said oven compartment through said pair of openings.

5. An oven as defined in claim 4, wherein said burner means each include an elongated burner tube of a length substantially corresponding to the front-to-rear length of the associated heat exchanger chamber having an axially spaced series of flame ports along the burner tube, and said heat exchanger means includes a collector enclosure in the form of an elongated hood of generally channel shaped configuration spanning the series of flame ports in spaced covering relation thereto for collecting the heat and products of combustion of flames at said flame ports, said heat tubes being mounted at their bottoms on said hood in communication with the zone enclosed thereby to receive heat and combustion products therefrom.

6. An oven as defined in claim 1, wherein said air blower means includes a rotary impeller having circumferentially spaced impeller vanes arranged in an annular path about an axis of rotation substantially adjacent the center of said rear wall for drawing air into the central zone of said impeller and discharging the air outwardly from the periphery of the impeller, said rear wall including a partition dividing said blower chamber from the oven compartment having a circular air intake opening therein concentric with said axis of rotation and conforming substantially with the diameter of the inner boundary of said annular path.

7. An oven as defined in claim 6, wherein said last-mentioned partition has a pair of air intake openings respectively located adjacent the top and bottom of said partition substantially aligned with said axis and spaced from said circular opening, and vane means in said blower chamber coacting with said impeller to produce suction conditions in said blower chamber immediately adjacent said pair of openings for withdrawing air from said oven compartment through said pair of openings.

8. An oven as defined in claim 7, wherein said burner means each include an elongated burner tube of a length substantially corresponding to the front-to-rear length of the associated heat exchanger chamber having an axially spaced series of flame ports along the burner tube, and said heat exchanger means includes a collector enclosure in the form of an elongated hood of generally channel-shaped configuration spanning the series of flame ports in spaced covering relation thereto for collecting the heat and products of combustion of flames at said flame ports, said heat tubes being mounted at their bottom on said hood in communication with the zone enclosed thereby to receive heat and combustion products therefrom.

9. An oven as defined in claim 1, wherein said burner means each include an elongated burner tube of a length substantially corresponding to the front-to-rear length of the associated heat exchanger chamber having an axially spaced series of flame ports along the burner tube, and said heat exchanger means includes a collector enclosure in the form of an elongated hood of generally channel-shaped configuration spanning the series of flame ports in spaced covering relation thereto for collecting the heat and products of combustion of flames at said flame ports, said heat tubes being mounted at their bottom on said hood in communication with the zone enclosed thereby to receive heat and combustion products therefrom.

10. An oven as defined in claim 1, wherein said perforations in said side partitions are arranged in discreet vertically spaced groups including top and bottom groups respectively adjacent the top and bottom of the oven compartment and a plurality of intermediate groups located therebetween, the number of perforations in said groups progressively increasing from the lowermost group to the uppermost group in selected relation to variation in temperature along said heat tubes.

References Cited

UNITED STATES PATENTS 2,490,076  12/1949  Maxson _____ 126—273 X
3,286,370  11/1966  Hope _____ 34—225 X FREDERICK KETTERER, *Primary Examiner.*